United States Patent [19]

McKenzie

[11] Patent Number: 5,199,211

[45] Date of Patent: Apr. 6, 1993

[54] FISHING APPARATUS

[75] Inventor: Alan N. McKenzie, Kelso, Australia

[73] Assignee: McKenzie's Fishing Company Pty Ltd, Tasmania, Australia

[21] Appl. No.: 777,227

[22] PCT Filed: Mar. 8, 1990

[86] PCT No.: PCT/AU90/00101

§ 371 Date: Nov. 5, 1991

§ 102(e) Date: Nov. 5, 1991

[87] PCT Pub. No.: WO90/10384

PCT Pub. Date: Sep. 20, 1990

[30] Foreign Application Priority Data

Mar. 8, 1989 [AU] Australia ............... PJ3104

[51] Int. Cl.$^5$ ........................................ A01K 69/10
[52] U.S. Cl. ........................ 43/105; 43/102;
414/137.7; 414/142.8; 294/68.24
[58] Field of Search ............... 43/100, 102, 103, 104,
43/105; 414/137.7, 142.8, 141.7; 294/68.24,
67.31, 81.51

[56] References Cited

U.S. PATENT DOCUMENTS

| | | | |
|---|---|---|---|
| 827,076 | 7/1906 | Bolitho | 43/100 |
| 1,117,023 | 11/1914 | Gandy | 414/137.7 |
| 2,605,917 | 8/1952 | Bennett . | |
| 2,761,571 | 9/1956 | Adams | 414/137.7 |
| 2,769,274 | 11/1956 | Ougland | 43/105 |
| 2,801,126 | 7/1957 | White et al. | 294/68.24 |
| 3,971,309 | 7/1976 | Brodie | 414/142.8 |
| 3,974,923 | 8/1976 | Mark et al. | 43/8 |
| 4,028,821 | 6/1977 | Hanks | 43/102 |
| 4,554,759 | 11/1985 | Edling et al. . | |
| 4,565,027 | 1/1986 | Sato | 43/102 |

FOREIGN PATENT DOCUMENTS 165750 10/1954 Australia .
30838 7/1984 Australia .
178992 4/1982 Japan .

Primary Examiner—Richard K. Seidel
Assistant Examiner—Chuck Y. Mah
Attorney, Agent, or Firm—Ware, Fressola, Van Der Sluys & Adolphson

[57] ABSTRACT

A shooting mechanism for depositing a fish trap into a body of water including a U-shaped main support frame (60) pivoted to a fishing vessel so as to extend outwardly from the vessel over the water. Two support gates (62, 63) are hinged for movement about a longitudinal direction so that the gates (62, 63) provide a support platform for the fishing trap, the two support gates (62, 63) hinging to their retracted positions simultaneously to allow the fishing trap to fall downwardly between the support gates (62, 63) and into the water. Also disclosed is a fish trap including a generally rectangular rigid base (10); a rigid front wall frame (14) which has a pivotal connection (14a) to the base (10) so as to be collapsible to lie generally flat upon the base (10); a back wall frame (15) with a pivotal connection (35) to the base (10) at a rear pivot position enabling the back wall frame (15) to be pivotally movable to an erected position. The pivotal connection (35) of the back wall frame (15) is selectively detachable from the base (10) enabling the lower portion of the back wall frame (15) to be moved generally towards the front wall frame (14) to a forward pivot position (37) and enable the back wall frame (15) to be pivoted downwardly about the forward pivot position (37) so as to lie generally flat upon and substantially within the boundaries of the base (10). A brace (42) is connected to the front wall frame (14) and extends downwardly and rearwardly from the front wall frame (14) to the base. The front wall frame (14) is connected to the back wall frame (15) by a flexible tether (51, 40). A retrieval apparatus for mounting to a fishing vessel is disclosed for use in retrieving a fishing trap (102) from a body of water and including an upright guide (100) for a fishing trap (102) being retrieved up the side (101) of the vessel.

17 Claims, 3 Drawing Sheets

FISHING APPARATUS

BACKGROUND OF THE INVENTION

This invention relates to fishing apparatus, particularly for commercial fishing operations.

In the past, it has been known to provide fish and crustacean traps having a mesh enclosure defining a cage and a generally funnel shaped mouth in the top through which the fish enters the trap but which prevents the fish from leaving the trap after entering. One particular problem with these known traps is that they occupy a very large volume of space when stowed on the deck of a fishing boat preparatory to use or after retrieval from the sea bed. Problems with foldable traps include the difficulty of erecting the traps easily, inability of some foldable traps to withstand rough handling, and inability to store the collapsed traps in a compact stack.

The launching or "shooting" of fish traps has in the past comprised a manual operation in which the trap is heaved over the side of the fishing boat. Retrieval of the traps has involved hauling the traps up the side of the boat and onto the deck. Both of these shooting and retrieving operations can be strenuous. Also, the nature of these operations has of necessity limited the usable size of the traps.

SUMMARY OF THE INVENTION

It is an object of a first aspect of the present invention to provide a shooting mechanism which enables ready release of fishing traps into the water, particularly relatively large fishing traps.

It is an object of a second aspect of the present invention to provide improved fishing apparatus in which larger traps can be used.

It is a particular object of a second aspect of the present invention to provide a trap which can be relatively compact for storage on board a fishing vessel.

It is a further preferred object of the second aspect of the present invention to provide a fish trap which can be very quickly erected from a collapsed condition.

It is a particular object of a third aspect of the present invention to provide a fishing trap retrieval apparatus enabling ready retrieval from the water of fishing traps and particularly relatively large fishing traps.

According to the first aspect of the present invention there is provided a shooting mechanism for depositing a fish trap into a body of water, the shooting mechanism including a main support frame for mounting to a fishing vessel so as to extend outwardly from the vessel over the water, a trap support gate mounted to the main support frame, the trap support gate being selectively movable from a supporting position in which it can support a fishing trap over the water and a retracted position in which the trap is allowed to fall freely into the water.

Preferably, the trap support gate is mounted to the main support frame for pivoting movement downwardly from its supporting position to its retracted position whereby upon downward pivoting movement of the trap support gate, a fishing trap can fall downwardly past the support gate and into the water. The trap support gate may comprise two support gates, each support gate being hinged for movement about a longitudinal direction at an outer edge of the support gate, the trap support gates being arranged so that their inner edges are generally adjacent when in the supporting position so that the gates provide a support platform for the fishing trap, the two support gates being movable to their retracted positions simultaneously to allow the fishing trap to fall downwardly between the support gates and into the water. The main support frame may be generally U shaped and preferably comprises inner and outer side support arms which respectively provide mountings for the hinging movement of the two support gates. In this embodiment, the inner side support arm of the main support frame may be pivotally mounted to the side of the fishing vessel so that the main support frame can be selectively pivoted upwardly and inwardly to a storage position with the main support frame being generally upright thereby clearing the shooting apparatus from projecting outside the lines of the vessel.

According to a second aspect of the present invention there is provided a fish trap including a generally rectangular rigid base for resting on the sea bed; a substantially rigid front wall frame which has a pivotal connection to the base so as to be collapsible to lie generally flat upon the base in a collapsed condition of the trap and being movable about the pivotal connection from the collapsed condition to an upright position in an erected condition of the trap; a back wall frame which is substantially rigid and which has a lower portion and, at the lower portion, a pivotal connection to the base at a rear pivot position enabling the back wall frame to be pivotally movable to an erected position in which the back wall frame defines at least the top edge of a back wall of the trap, the pivotal connection of the back wall frame being selectively detachable from the base thereby enabling the lower portion of the back wall frame to be moved generally towards the front wall frame to a forward pivot position and enable the back wall frame to be pivoted downwardly about the forward pivot position so as to lie generally flat upon and substantially within the boundaries of the base in the collapsed condition of the trap.

Preferably the base has a front end edge where the pivotal connection of the front wall frame to the base is located and a back end edge generally parallel to and spaced from the front end edge, the rear pivot position for the back wall frame being located forwardly from the back end edge of the base towards the front end edge so that in the erected condition of the trap, the back wall frame extends upwardly and rearwardly from the rear pivot position to the top edge of the back wall of the trap.

The pivotal connection at the lower portion of the back wall frame may comprise a pivotal connection between the back wall frame and the base at both side edges of the base. In this embodiment, the back wall frame may have a generally inverted U shape, the opposite arms of the U-shape terminating in pivotal connection points for forming the pivotal connection between the back wall frame and the base. The opposite arms of the U-shape may be resiliently movable towards each other, the pivotal connection points at the ends of the arms including respective pivot pins which are co-operable with pivot holes provided in the base, the arms being resiliently movable relative to each other to selectively engage the pivot pins with and disengage the pivot pins from the co-operating pivot holes.

The front wall frame preferably has associated therewith a brace, the brace being pivotally connected to the front wall frame and being arranged to extend downwardly and rearwardly from the front wall frame to the base, the brace being co-operable with anchor points provided on the base and which are spaced from the front wall frame towards the back wall frame so that the brace when engaged with the anchor points braces the front wall frame against collapsing onto the base from the upright position. The brace provides a simple, quick and effective means for maintaining the trap in its erected condition.

The front wall frame is preferably connected to the back wall frame by a flexible tether, the point of tethering to the front frame being above the pivotal connection of the front wall frame to the base and the point of tethering of the back wall frame also being above the pivotal connection of the back wall frame to the base so that as the front wall frame is moved about the pivotal connection from the collapsed condition to its upright position, the tether draws the back wall frame upwardly about the pivotal connection of the back wall frame to the base at the rear pivot position thereby drawing the back wall frame to its erected position.

The fish trap may further include a center frame which is substantially rigid and which has a pivotal connection to the base, the center frame being collapsible to lie generally flat upon the base in the collapsed condition of the trap and being movable about its pivotal connection to an upright position in which it is located between the front wall frame and the back wall frame, the center frame defining at least a top support extending across above the base for supporting a top wall of the trap generally centrally between the front wall frame and the back wall frame.

The front and back wall frames preferably support a flexible mesh which defines at least opposite side walls and a top wall of the fish trap, the mesh crumpling onto the base when the fish trap is in its collapsed position and being substantially taut when the trap is in its erected condition.

According to a third aspect of the present invention, there is provided a retrieval apparatus for mounting to a fishing vessel and for use in retrieving a fishing trap from a body of water, the retrieval apparatus including a guide for location in an upright position in which it extends down the side of the vessel, the guide being operative in use to guide a fishing trap being retrieved up the side of the vessel, the guide including a top rail arranged in use above the deck of the vessel and over which a line for drawing the trap up the guide can run, the guide further including a pivot connection arrangement for mounting of the guide to the vessel generally at deck level and enabling hinging movement of the guide about a generally horizontal axis extending along the side of the vessel, the pivot connection arrangement being located above the center of gravity of the guide so that the guide is movable from a generally horizontal position in which the top rail is drawn downwardly generally to deck level, the movement being under the action of gravity towards the generally upright position in which the guide extends down the side of the vessel towards the water level.

The guide may comprise a generally rectangular frame having guide rails which extend generally vertically in the normal upright position of the guide. The retrieval apparatus may further include a releasable locking arrangement for releasably locking the guide in its generally vertical rest position and preventing pivoting movement of the guide until an operator releases the locking arrangement whereby the guide will not prematurely pivot towards its generally horizontal position when the retrieval line is drawing a trap up through the water and before the trap reaches the water surface and starts to be raised up the side of the vessel along the guide.

Possible and preferred features of the present invention will now be described with particular reference to the accompanying drawings. However it is to be understood that the features illustrated in and described with reference to the drawings are not to be construed as limiting on the scope of the invention. In the drawings:

DETAILED DESCRIPTION OF THE INVENTION

Figure 1:
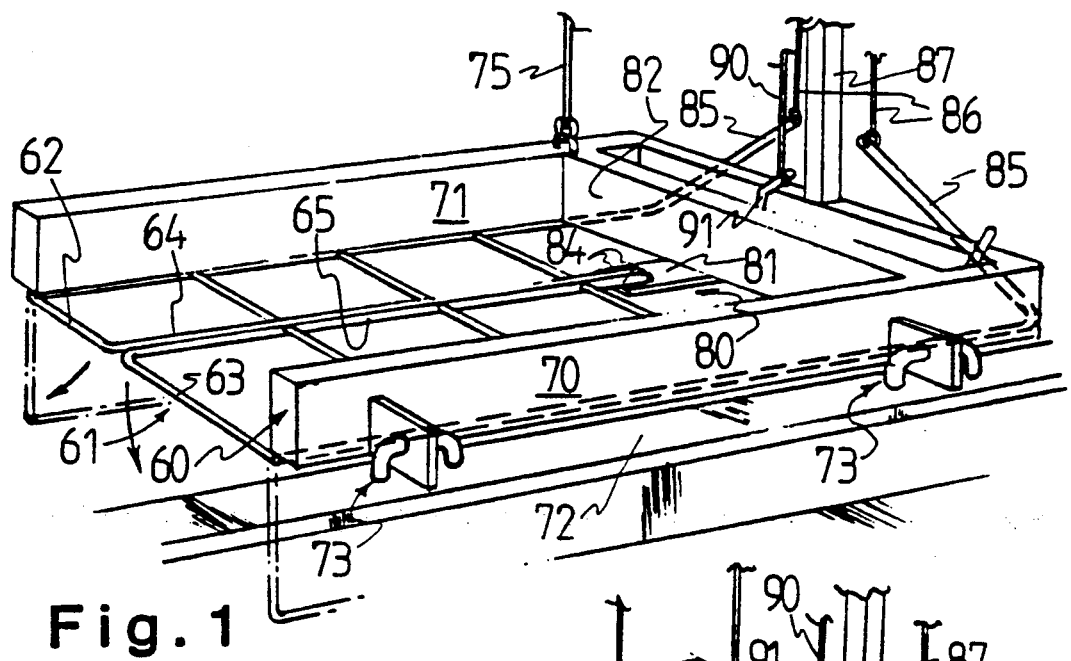
FIG. 1 is a schematic perspective view of shooting apparatus according to the first aspect of the present invention.
Figure 2:
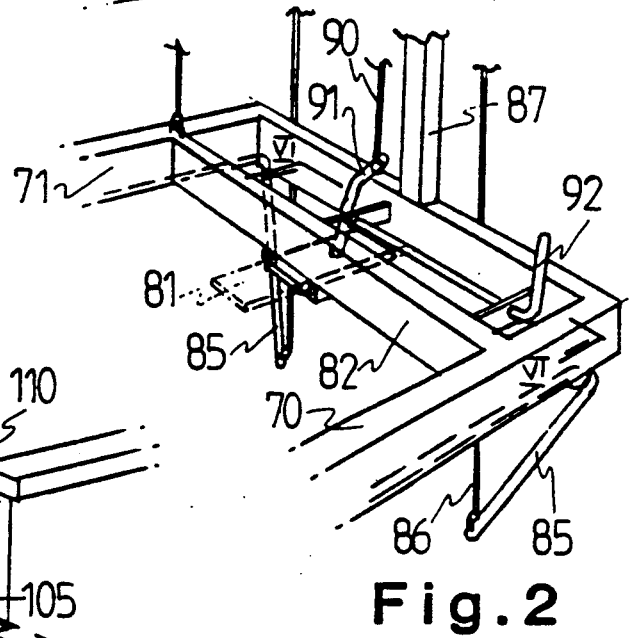
FIG. 2 is a detailed view of mechanisms for releasing and resetting the trap support gate of the shooting apparatus.
Figure 3:
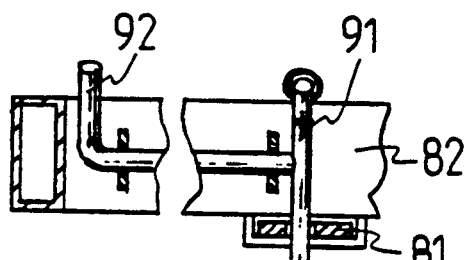
FIG. 3 is a section through line VI—VI (FIG. 2).

The shooting mechanism according to the first aspect of the present invention and shown in FIGS. 1 to 3 includes a main support frame 60 mounted to the fishing vessel so as to extend outwardly from the vessel over the water. A trap support gate 61 is mounted to the main support frame 60 and selectively movable from a supporting position (solid line in FIG. 1) in which it can support a fishing trap over the water and a retracted position (broken line in FIG. 1) in which the trap can fall into the water.

The trap support gate 61 is mounted for pivoting movement downwardly from its supporting position to its retracted position, the trap support gate 61 in its retracted position being beneath the main support frame 60 but displaced from beneath the position of the supported fish trap. The trap support gate 61 comprises two support gates 62, 63 hinged for movement about a longitudinal direction at outer edges. The trap support gates 62, 63 at their inner edges 64, 65 are generally adjacent in the supporting position so that the gates 62, 63 together provide a support platform for the fishing trap. When the support gates 62, 63 are moved to their retracted positions, they simultaneously fold downwardly and outwardly to allow the fishing trap to fall downwardly between the support gates 62, 63 and into the water.

The main support frame 60 in the illustrated embodiment is generally U shaped and comprises inner and outer side support arms 70, 71 which provide the mountings for the hinging movement of the two support gates 62, 63. The inner side support arm 70 is pivotally mounted at 73 to the side 72 of the fishing vessel so that the main support frame 60 can be selectively pivoted upwardly and inwardly about the pivots 73 to a storage position with the main support frame 60 being generally upright thereby clearing the shooting apparatus from projecting outside the lines of the vessel. Main support line 75 is provided at the outer corner of the frame 60 and by drawing that line upwardly and inwardly the frame 60 is raised.

The shooting apparatus includes a releasable support 80 for supporting the trap support gate 61 in its supporting position and for being selectively released to allow the trap support gate 61 to move under gravity to its retracted position for dropping the fishing trap. The releasable support 80 comprises a sliding plate 81 mounted to the transverse arm 82 of the generally U shaped main support frame 60, the sliding plate 81 in its supporting position (shown in broken line in FIG. 2) extending rearwardly beneath the adjacent forward extension portions 84 of the two support gates 62, 63 and being slidable to withdraw from its supporting position beneath the support gates 62, 63.

The support gates 62, 63 are returnable from their retracted to their supporting positions by crank arms 85 extending from the support gates at their pivot axes, e.g. generally adjacent to the transverse arm 82 of the U-shaped main support frame 60. The crank arms 85 are liftable by means of lifting lines 86 passing upwardly through a pulley (not shown) mounted to upright post 87 above the main support frame 60, the lifting lines 86 passing inboard to enable control from the vessel. Similarly the releasable support 81 for the support gate 61 can be remotely operated from the vessel by means of a release line 90 such as a Morse cable extending from a releasing lever mechanism 91 through a guide above the main support frame 60 and extending inboard e.g. to the wheel house of the vessel, operation of the releasing line 90 causing the releasing lever mechanism 91 to retract the sliding plate 81 away from its supporting position beneath the support gate 61 thereby releasing the support gate to open under gravity. The reset lever handle 92 is manually operated from the vessel to re-insert the sliding plate 81 beneath the extensions 84 at the forward inner edges of the support gates 62, 63 when the gates 62, 63 have been raised by operation of lines 86. Alternatively, the sliding plate 81 can be re-inserted by reverse operation of a release lever (not shown) in the wheel house which operates the Morse cable 90.

Figure 4:
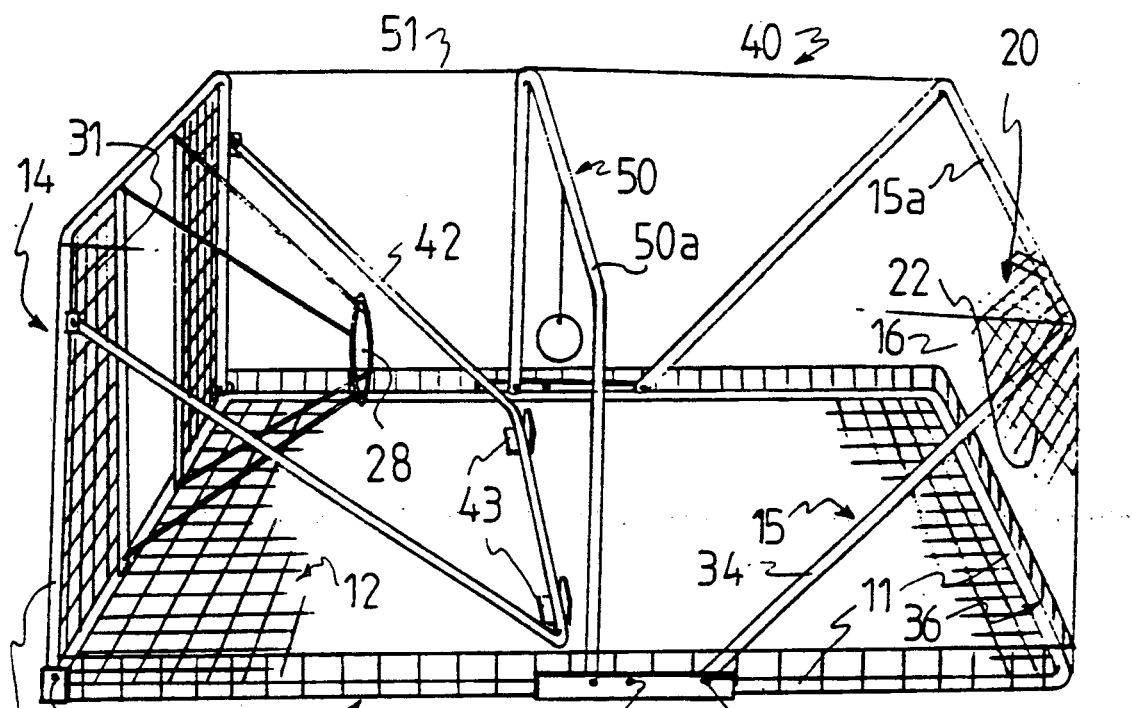
FIG. 4 is a perspective view of an erected fishing trap according to the second aspect of the present invention.
Figure 5:
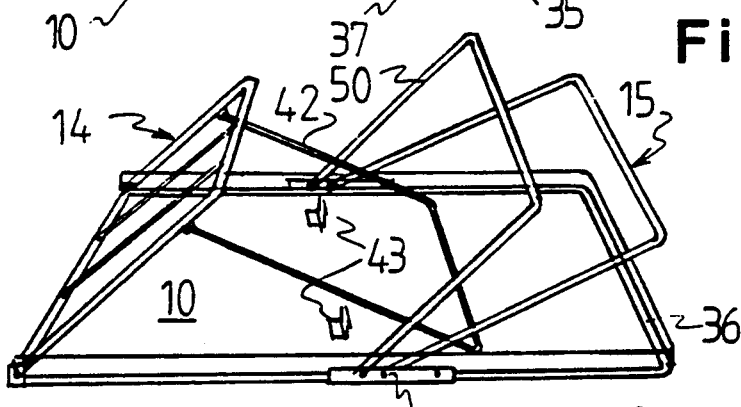
FIG. 5 shows the trap of FIG. 1 partially collapsed.
Figure 6:
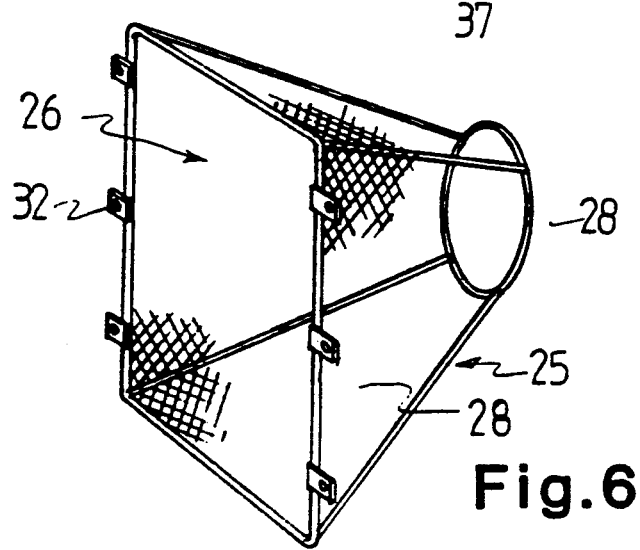
FIG. 6 is a detailed perspective view of the trap entrance portion.

The fishing trap illustrated in FIGS. 4 to 6 includes a rectangular base 10 made of a peripheral frame 11 and rigid mesh 12 for resting on the sea bed, deck of a fishing vessel or on the ground. A front wall 14 is mounted to the base 10 so as to be pivotable about connection 14a to lie generally flat upon the base in a collapsed condition of the trap. A back wall portion 15 which is collapsable so as to closely overlie the base 10 in the collapsed condition. The front and back wall portions 14, 15 define a support frame for a flexible mesh which defines the top wall 20 and opposite side walls 21, 22 of the trap when erected. An entrance portion 25 including a mouth 26 is provided in the front wall 14 of the trap, the mouth 26 leading to a passage 27 through which a fish or crustacean passes to enter the trap through an inner opening 28 at the inner end of the passage 27, the opening 28 of the passage 27 being elevated above the base 10 in a erected condition of the trap so as to inhibit return of the fish out of the trap.

The entrance portion 25 is selectively removable from the front wall 14 so that the front wall can be collapsed onto the base 10 and the entrance portion 25 has a generally tapering shape so as to be capable of nesting with similar entrance portions for compact stacking and storage.

The front wall 14 comprises a U-shaped front peripheral frame portion 30 which is hinged to the base 10 at the bottom edge and a mesh portion 31 within the peripheral frame, the mesh portion 31 defining an opening where the entrance portion 25 is in use mounted by lugs 32 so that the passage 28 extends inwardly from the mouth 26 in the mesh portion and tapers inwardly to provide a relatively narrow opening 28 into the trap elevated above the base 10.

The back wall portion 15 comprises a U-shaped peripheral frame 34, the back peripheral frame 34 being longer than the height of the trap and hinged to the base 10 at a rear pivot connection 35 spaced from the back end edge 36 of the base 10. With this arrangement, the back peripheral frame 34 is capable of hinging movement but the general plane of the back peripheral frame is inclined to the general plane of the base 10 when the trap is in its fully erected condition as shown in FIG. 4, the back peripheral frame 34 being restrained against further hinging movement away from the front wall 14 under the weight of the back frame 34 by a tether 40 extending from the back peripheral frame 34 forwardly towards the front wall 14. With this arrangement, in order to collapse the back wall frame 34 onto the base 10, the pivot connection 35 is releasable from the base 10 so as to enable the lower extremities of the back peripheral frame 34 to slide forwardly along the base 10 to forward pivot connection 37 while at the same time the back peripheral frame 34 folds downwardly onto the base 10 (see FIG. 5).

The trap includes a brace member 42 for bracing the front wall 14 against collapsing onto the base 10 when it is erected. The brace 42 is hinged to the front frame 14 and engages with projections 43 on the base 10 so that the front wall 14 can be quickly and easily erected and supported.

The trap includes a center frame 50 which is generally U-shaped and which is also hinged to the base 10 for collapsing flat onto the base. The center frame 50 is tethered by line 51 to the front wall 14 in the erected condition of the trap, the back peripheral frame 34 in turn being tethered to the center frame 50 by line 40 so that the inclination of the back peripheral frame 34 acts to pull the center frame 50 about its lower hinged connected to the base 10 towards the back wall 16, the tether 51 to the center frame 50 in turn restraining the center frame 50 from such movement and thereby restraining the back peripheral frame 34 from further movement. Bait 65 is suspended from the center frame 50 to attract fish or crustaceans into the trap.

The retrieval apparatus according to the third aspect of the present invention includes a guide 100 for location in an upright position in which it extends down the side 101 of a vessel and into the water, the guide 100 being operative in use to guide a fishing trap 102 being retrieved up the side of the vessel. The guide 100 includes a top rail 103 arranged in use above the deck of the vessel and over which a line 104 for drawing the trap 102 up the guide can run. The guide 100 further includes a pivot connection arrangement 105 for mounting the guide 100 to the vessel generally at deck level and for hinging movement about a generally horizontal axis along the side 101 of the vessel, the pivot connection arrangement 105 being located above the center of gravity of the guide 100 so that the guide 100 is movable from a generally horizontal position (shown in broken line in FIG. 7) in which the top rail 103 is drawn downwardly generally to deck level, the movement being under the action of gravity towards the generally upright position in which the guide 100 extends down the side 101 of the vessel towards the water level.

The guide 100 comprises a generally rectangular frame 110 having guide rails 111 which extend generally vertically in the normal generally vertical rest position of the retrieval apparatus, the guide rails 111 in use guiding the fishing trap 102 up the side 101 of the vessel.

The lower ends 112 of the guide rails where the guide 100 preferably extends slightly below water level are turned inwardly towards the vessel to assist guidance of the fishing trap 102 being retrieved outwardly and up the outside of the guide 100.

The pivot connection arrangement 105 may comprise lugs mounted to the guide rails 111 through which pivot pins pass to connect the guide 100 to corresponding lugs mounted at the edge 113 of the vessel's deck.

Figure 8:
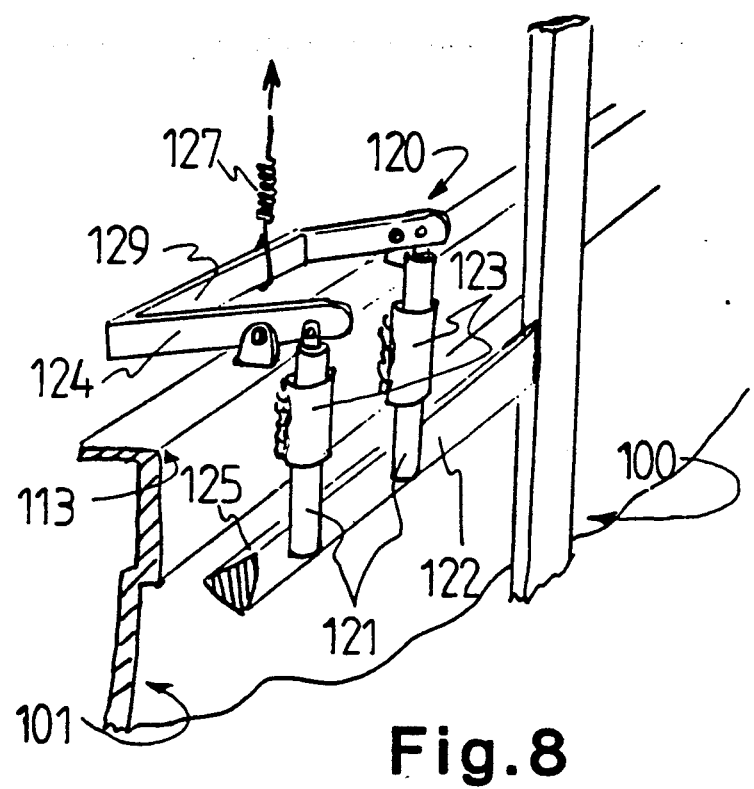
FIG. 8 is a perspective view of a fragment of the guide of the retrieval apparatus and the releasable locking arrangement.

The retrieval apparatus includes a releasable locking arrangement 120 for releasably locking the guide 100 in its generally vertical rest position and preventing pivoting movement of the guide until the operator releases the locking arrangement. With this feature, the guide 100 will not prematurely tilt to the horizontal, e.g. when the retrieval line 104 is drawing a trap 102 up from the sea bed and before the trap reaches the surface and starts to be raised up the side of the vessel along the guide 100. The locking arrangement 120 comprises selectively retractable pins 121 arranged to overlie and to restrain a part 122 of the guide from moving away from the side 101 of the vessel as a result of the guide 100 pivoting away from its upright position towards its horizontal position. The retractable pins 121 are mounted in respective guide sleeves 123 which enable the pins to slidably move, movement of the retractable pins being effected by means of a lever 124 connected to the end of each retractable pin 121 remote from its operative guide restraining end. The lever 124 is biased by spring 127 into its operative position as shown in FIG. 8 in which the retractable pin 121 locks the guide 100 against movement away from its upright position. The lever 121 comprises a foot operated bar 129 mounted at the edge 113 of the deck adjacent where the guide 100 is pivoted to the vessel which can be pressed by an operator to release the pins 121 and allow pivoting movement of the guide 100 from its upright to its horizontal position.

With this arrangement of retrieval apparatus, when a fishing trap is being retrieved, one or more retrieval lines 104 can be passed upwardly from the fishing trap 102, over the top rail 103 to be hauled upon by a fisherman or by a winch. As the fishing trap 102 is drawn upwardly towards or past the deck level and therefore towards or past the pivot axis, release of the locking arrangement 120 enables the guide 100 to be drawn inboard at its top edge so that the guide will bring inboard the fishing trap located on the upper portion of the guide. If desired the guide can be releasably retained in this position while the retrieval line 104 is disconnected and the fishing trap 102 recovered and removed from the guide. Releasing of the guide 100 will then allow the guide to pivot backwardly under its own weight to its upright position ready for retrieval of a further fishing trap. The retractable pin 121 of the locking arrangement may be moved automatically out of the path of the guide part 122 which is subsequently restrains, e.g. by means of a ramp surface 125 on the guide part, the retractable pin 121 returning to its operative locking position under the action of the biasing force after the guide part 122 has passed.

Figure 7:
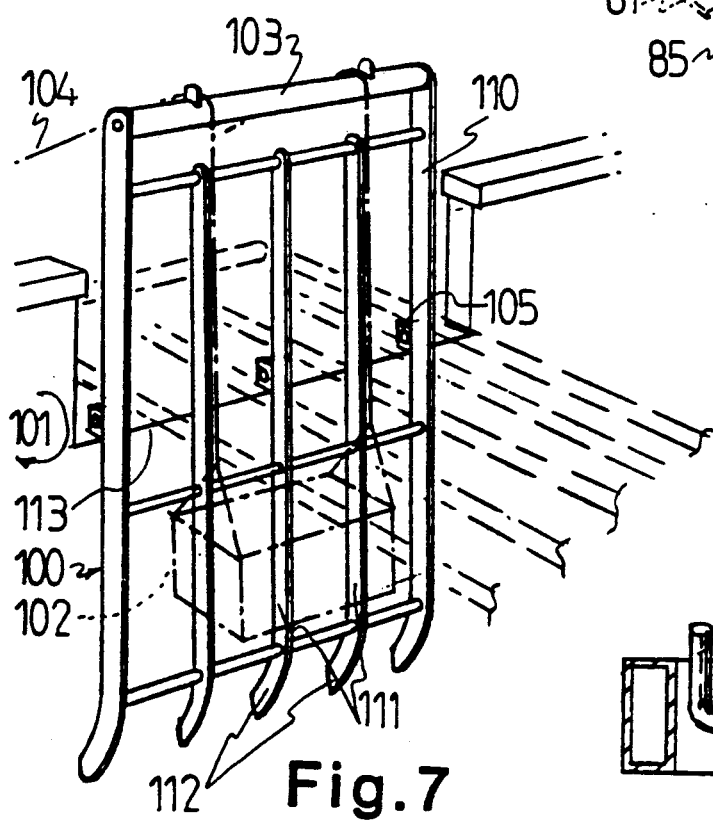
FIG. 7 is a perspective view of a retrieval apparatus according to the third aspect of the present invention.

In addition to being used as described for retrieving fishing baskets, the apparatus in FIGS. 7 and 8 can also be used if desired for positioning and dropping fishing traps into the water by a reverse of the retrieval operation.

It will be seen that the apparatus as herein described and illustrated in the drawings can effectively enable fishing operations to be carried with advantages over the prior apparatus described earlier. In particular, the traps can be compactly stacked on top of one another on deck in a collapsed condition. The boundaries of the base of the trap define the maximum dimensions of the trap when collapsed. The shooting and retrieval apparatus enable relatively large traps to be used and manipulated with relative ease so that the traps can be left longer on the sea bed and effect larger catches. The shooting and retrieval apparatus can be installed on existing fishing craft.

It is to be understood that various alterations, modifications and/or additions may be made to the features of the possible and preferred embodiment(s) of the invention as herein described without departing from the scope of the invention as defined in the appended claims.

I claim:

1. A shooting mechanism for depositing a fish trap into a body of water, the fish trap having a collapsed condition and an erected operable condition; the trap having a base wall, a front wall and a rear wall which, in the collapsed condition, lie generally flat on the base wall and which, in the erected operable condition, occupy upright positions to define front and rear walls of the erected fish trap; the shooting mechanism including a main support frame for mounting to a fishing vessel so as to extend outwardly from the vessel over the water, a trap support gate mounted to the main support frame the trap support gate having a supporting position extending generally horizontally and in which it supports the fishing trap in its erected operable condition over the water, the trap support gate being selectively movable from the supporting position to a retracted position so that the trap is allowed to fall freely past the trap support gate into the water.

2. A shooting mechanism as claimed in claim 1 wherein the trap support gate is mounted to the main support frame for pivoting movement downwardly from its supporting position to its retracted position whereby upon downward pivoting movement of the trap support gate, a fishing trap can fall downwardly past the support gate and into the water.

3. A shooting mechanism as claimed in claim 2 wherein the trap support gate comprises two support gates, each support gate being hinged for movement about a longitudinal direction at an outer edge of the support gate, the trap support gates being arranged so that their inner edges are generally adjacent when in the supporting position so that the gates provide a support platform for the fishing trap, the two support gates being movable to their retracted positions simultaneously to allow the fishing trap to fall downwardly between the support gates and into the water.

4. A shooting mechanism as claimed in claim 3 wherein the main support frame is generally U-shaped and comprises inner and outer side support arms which respectively provide mountings for the hinging movement of the two support gates.

5. A shooting mechanism as claimed in claim 4 wherein the inner side support arm of the main support frame is pivotally mounted to the side of the fishing vessel so that the main support frame can be selectively pivoted upwardly and inwardly to a storage position with the main support frame being generally upright thereby clearing the shooting apparatus from projecting outside the lines of the vessel.

6. A fish trap including a generally rectangular rigid base for resting on the sea bed; a substantially rigid front wall frame which has a pivotal connection to the base so as to be collapsible to lie generally flat upon the base in a collapsed condition of the trap and being movable about the pivotal connection from the collapsed condition to an upright position in an erected condition of the trap; a back wall frame which is substantially rigid and which has a lower portion and, at the lower portion, a pivotal connection to the base at a rear pivot position enabling the back wall frame to be pivotally movable to an erected position in which the back wall frame defines at least a top edge of a back wall of the trap, the pivotal connection of the back wall frame being selectively detachable from the base thereby enabling the lower portion of the back wall frame to be moved generally towards the front wall frame to a forward pivot position and enable the back wall frame to be pivoted downwardly about the forward pivot position so as to lie generally flat upon and substantially within the boundaries of the base in the collapsed condition of the trap.

7. A fish trap as claimed in claim 6 wherein the base has a front end edge where the pivotal connection of the front wall frame to the base is located and a back end edge generally parallel to and spaced from the front end edge, the rear pivot position for the back wall frame being located forwardly from the back and edge of the base towards the front end edge so that in the erected condition of the trap, the back wall frame extends upwardly and rearwardly from the rear pivot position to the top edge of the back wall of the trap.

8. A fish trap as claimed in claim 6 wherein the pivotal connection at the lower portion of the back wall frame comprises a pivotal connection between the back wall frame and the base at both side edges of the base.

9. A fish trap as claimed in claim 8 wherein the back wall frame has a generally inverted U-shape, the opposite arms of the U-shape terminating in pivotal connection points for forming the pivotal connection between the back wall frame and the base.

10. A fish trap as claimed in claim 9 wherein the opposite arms of the U-shape are resiliently movable towards each other, the pivotal connection points at the ends of the arms including respective pivot pins which are co-operable with pivot holes provided in the base, the arms being resiliently movable relative to each other to selectively engage the pivot pins with and disengage the pivot pins from the co-operating pivot holes.

11. A fish trap as claimed in claim 6 wherein the front wall frame has associated therewith a brace, the brace being pivotally connected to the front wall frame and being arranged to extend downwardly and rearwardly from the front wall frame to the base, the brace being co-operable with anchor points provided on the base and which are spaced from the front wall frame towards the back wall frame so that the brace when engaged with the anchor points braces the front wall frame against collapsing onto the base from the upright position.

12. A fish trap as claimed in claim 6 wherein the front wall frame is connected to the back wall frame by a flexible tether, the tether being attached to the front frame above the pivotal connection of the front wall frame to the base and the tether being attached to the back wall frame also above the pivotal connection of the back wall frame to the base so that as the front wall frame is moved about the pivotal connection from the collapsed condition to its upright position, the tether draws the back wall frame upwardly about the pivotal connection of the back wall frame to the base at the rear pivot position thereby drawing the back wall frame to its erected position.

13. A fish trap as claimed in claim 6 and further including a center frame which is substantially rigid and which has a pivotal connection to the base, the center frame being collapsible to lie generally flat upon the base in the collapsed condition of the trap and being movable about its pivotal connection to an upright position in which it is located between the front wall frame and the back wall frame, the center frame defining at least a top support extending across above the base for supporting a top wall of the trap generally centrally between the front wall frame and the back wall frame.

14. A fish trap as claimed in claim 6 wherein the front and back wall frames support a flexible mesh which defines at least opposite side walls and a top wall of the fish trap, the mesh crumpling onto the base when the fish trap is in its collapsed position and being substantially taut when the trap is in its erected condition.

15. A retrieval apparatus for mounting to a fishing vessel and for use in retrieving a fishing trap from a body of water, the retrieval apparatus including a guide, having a center of gravity, for location in an upright position in which it extends down the side of the vessel, the guide being operative in use to guide a fishing trap being retrieved up the side of the vessel, the guide including a top rail arranged in use above the deck of the vessel and over which a line for drawing the trap up the guide can run, the guide further including a pivot connection arrangement for mounting of the guide to the vessel generally at deck level and enabling hinging movement of the guide about a generally horizontal axis extending along the side of the vessel, the pivot connection arrangement being located above the center of gravity of the guide so that the guide is movable from a generally horizontal position in which the top rail is drawn downwardly generally to deck level, the movement being under the action of gravity towards the generally upright position in which the guide extends down the side of the vessel towards the water level, the retrieval apparatus further including a releasable locking arrangement for releasably locking the guide in said generally upright position and preventing pivoting movement of the guide until an operator releases the locking arrangement whereby the guide will not prematurely pivot towards its generally horizontal position when the retrieval line is drawing a trap up through the water and before the trap reaches the water surface and starts to be raised up the side of the vessel along the guide.

16. A retrieval apparatus as claimed in claim 15 wherein the guide comprises a generally rectangular frame having guide rails which extend generally vertically in the normal upright position of the guide.

17. A fishing apparatus for use on a fishing vessel comprising:

A. a fish trap including a generally rectangular rigid base for resting on the sea bed; a substantially rigid front wall frame which has a pivotal connection to the base so as to be collapsible to lie generally flat upon the base in a collapsed condition of the trap and being movable about the pivotal connection from the collapsed condition to an upright position in an erected condition of the trap; a back wall frame which is substantially rigid and which has a lower portion and, at the lower portion, a pivotal connection to the base at a rear pivot position enabling the back wall frame to be pivotally movable to an erected position in which the back wall frame defines at least a top edge of a back wall of the trap, the pivotal connection of the back wall frame being selectively detachable from the base thereby enabling the lower portion of the back wall frame to be moved generally towards the front wall frame to a forward pivot position and enable the back wall frame to be pivoted downwardly about the forward pivot position so as to lie generally flat upon and substantially within the boundaries of the base in the collapsed condition of the trap;

B. a shooting mechanism for depositing the fish trap into a body of water, the shooting mechanism including a main support frame for mounting to the fishing vessel so as to extend outwardly from the vessel over the water, a trap support gate mounted to the main support frame, the trap support gate being selectively movable from a supporting position in which it can support the fish trap over the water and a retracted position in which the trap is allowed to fall freely into the water; and C. a retrieval apparatus for mounting to the fishing vessel and for use in retrieving the fishing trap from a body of water after release from the shooting mechanism, the retrieval apparatus including a guide, having a center of gravity, for location in an upright position in which it extends down a side of the vessel, the guide being operative in use to guide the fishing trap being retrieved up the side of the vessel, the guide including a top rail arranged in use above a deck level of the vessel and over which a line for drawing the trap up the guide can run, the guide further including a pivot connection arrangement for mounting of the guide to the vessel generally at deck level and enabling hinging movement of the guide about a generally horizontal axis extending along the side of the vessel, the pivot connection arrangement being located above the center of gravity of the guide so that the guide is movable from a generally horizontal position in which the top rail is drawn downwardly generally to deck level, the movement being under the action of gravity towards the generally upright position in which the guide extends down the side of the vessel towards the water level.

* * * * *